United States Patent
McKee et al.

(10) Patent No.: US 7,632,532 B2
(45) Date of Patent: Dec. 15, 2009

(54) PRODUCT AND METHOD FOR ORAL ADMINISTRATION OF NUTRACEUTICALS

(75) Inventors: Dwight McKee, Aptos, CA (US); Amanda Karwic, Elverson, PA (US)

(73) Assignee: Eurak, LLC, Batesville, AR (US)

( * ) Notice: Subject to any disclaimer, the term of this patent is extended or adjusted under 35 U.S.C. 154(b) by 534 days.

(21) Appl. No.: 11/298,724

(22) Filed: Dec. 9, 2005

(65) Prior Publication Data

US 2006/0134294 A1   Jun. 22, 2006

Related U.S. Application Data

(60) Provisional application No. 60/634,493, filed on Dec. 9, 2004.

(51) Int. Cl.
*A23L 1/236* (2006.01)

(52) U.S. Cl. .................. 426/548; 426/72; 426/73; 426/660

(58) Field of Classification Search .............. 426/72, 426/548, 658, 659, 660, 73
See application file for complete search history.

(56) References Cited

U.S. PATENT DOCUMENTS

| | | | |
|---|---|---|---|
| 4,818,539 A | 4/1989 | Shaw et al. | |
| RE33,719 E | 10/1991 | Levin | |
| 5,891,465 A | 4/1999 | Keller et al. | |
| 6,051,236 A | 4/2000 | Portman | |
| 6,087,353 A | 7/2000 | Stewart et al. | |
| 6,139,897 A | 10/2000 | Goto et al. | |
| 6,423,363 B1 | 7/2002 | Traska et al. | |
| 6,432,464 B1 | 8/2002 | Andersen | |
| 6,569,445 B2 | 5/2003 | Manning et al. | |
| 6,576,253 B2 | 6/2003 | Manning et al. | |
| 6,582,747 B2 | 6/2003 | Myers et al. | |
| 6,610,320 B2 | 8/2003 | Schmitz et al. | |
| 6,638,457 B2 | 10/2003 | Perlmann et al. | |
| 6,673,380 B2 | 1/2004 | Yang et al. | |
| 6,677,327 B1 | 1/2004 | Gottemoller | |
| 6,773,743 B1 * | 8/2004 | Singer .................. 426/658 |
| 2002/0156051 A1 | 10/2002 | Kutney et al. | |
| 2003/0232797 A1 | 12/2003 | Kutney et al. | |
| 2004/0236125 A1 | 11/2004 | Kutney et al. | |
| 2005/0069625 A1 | 3/2005 | Chimel et al. | |
| 2005/0100619 A1 | 5/2005 | Chen et al. | |
| 2005/0175745 A1 | 8/2005 | Zawitowski | |

FOREIGN PATENT DOCUMENTS

GB       2214051       *   8/1989

* cited by examiner

*Primary Examiner*—Leslie Wong
(74) *Attorney, Agent, or Firm*—William J. Sapone; Coleman Sudol Sapone P.C.

(57) ABSTRACT

A delivery system for nutraceuticals uses a low caloric chocolate base for containing one or more nutraceuticals, either blended with the chocolate itself, or added as a liquid or crème filling. The chocolate has a relatively high level of oligomeric proanthocyanidins, and preferably further includes a phytosterol and DHA, as well as being sweetened with a sweetener blend containing tagatose and a secondary low caloric, high intensity sweetener, preferably Lo Han Guo extract. Using the inventive system, delivery of nutraceuticals in unit dosage form is facilitated, as the selected dose is carried within individual chocolate product pieces that taste substantially the same as conventional chocolate, though with few calories from carbohydrates, or effects on insulin response encountered with typical chocolate formulations.

12 Claims, No Drawings

PRODUCT AND METHOD FOR ORAL ADMINISTRATION OF NUTRACEUTICALS

TECHNICAL FIELD

This invention relates to a system and method for oral administration to individuals of various nutraceuticals, such as for example plant concentrates, having beneficial properties, and more particularly for delivering nutraceuticals in a confectionery or chocolate matrix utilizing a novel sweetening composition.

BACKGROUND

Various plant extracts and/or concentrates are known which are recognized as having beneficial health properties, yet often, many of these are rarely used or if used, are not taken consistently so that levels in the body are not maintained at the optimum levels. This may also occur with vitamins, plant and mineral supplements, amino acids, etc., collectively referred to herein as "nutraceuticals". Consequently, a large segment of the population has failed to achieve the health benefits associated with nutraceuticals in general.

One major reason appears to be the delivery system. For example, many nutraceuticals have a bitter or unpleasant taste, leave an after taste, or are too medicinal, being in pill, tablet or capsule form, which many individuals simply object to consuming.

Efforts have been made to incorporate various nutraceuticals into foods or beverages, with some limited success. However, the amounts of these beneficial nutraceutical ingredients are typically very low relative to what one must consume. This requires consumption of rather large food or beverage items, relative to the quantity of the beneficial ingredient.

In a food or beverage, it is common to try to mask any off flavor or after taste by the use of sweeteners. These increase the caloric intake, and can alter the glycemic index, and so counter the beneficial effects sought by consuming these products.

What is needed is a system for delivering nutraceuticals in a vehicle that is flavorful, not a pill, tablet, capsule or other medicinal form, yet one having a relatively high concentration of the nutraceutical relative to the vehicle amount, and additionally, a system which avoids the use of caloric sweeteners, such as sucrose, or high fructose corn syrup.

SUMMARY OF THE INVENTION

It is an object of the present invention to provide a system and method for the oral administration of nutraceuticals in a flavorful vehicle or base.

It is another object to provide the base with a novel non-caloric sweetener.

It is yet another object to provide nutraceuticals, in particular, plant concentrates or extracts, in a novel chocolate base, using a novel sweetener.

These and other objects of the present invention are achieved by a method comprising providing a chocolate base composition, providing a sweetening agent containing a combination of tagatose and Lo Han Guo, preparing a chocolate product, and adding an effective amount of the nutraceutical to the chocolate product either as a filling, or integrated into the chocolate base composition.

The product of the present invention comprises a nutraceutical containing chocolate product having a chocolate base composition formulated with a sweetening agent comprising a mixture of tagatose and Lo Han Guo, and containing an effective amount of a nutraceutical. Preferably, the chocolate product is prepared for consumption as multiple individual bite sized portions, each portion containing a dose of the nutraceutical therein, which may be in solid or liquid form, or integrated into the chocolate base formulation.

Using the present invention, various nutraceuticals can be delivered in a good tasting vehicle, without using caloric sweeteners, and without detrimentally affecting the glycemic index of the consumer. This allows the user to obtain the beneficial effects of the nutraceutical, without the use of pills, tablets, capsules or bitter tasting liquids or suspensions. Both the chocolate and the sweetener substantially mask the flavor of the nutraceutical.

DETAILED DESCRIPTION OF THE INVENTION

The present invention utilizes a confectionery, preferably a chocolate base composition, which acts as a vehicle in a delivery system for delivering nutraceuticals in a convenient unit dose form, the details of which will be explained more fully below.

By way of definitions, the term "nutraceutical" means a natural component of food or other ingestible forms that have been determined to be beneficial to the human body in preventing or treating one or more diseases or improving physiological performance. Essential nutrients can be considered nutraceuticals if they provide a benefit beyond their essential role in normal growth or maintenance of the human body. As used herein, a nutraceutical is defined as any substance that is administered as a dietary supplement to a subject. Any form of nutritional supplement that is capable of being blended with the chocolate formulations discussed below, or which can be formulated as a confectionery filling incorporated within a chocolate shell can be included in the preparations of the present invention. Such supplements can be purified vitamins or minerals, herbs, or plant extracts. The preferred nutritional supplements are extracts or concentrates of plants, including herbal plants. Examples of the range of such nutritional supplements usable in the invention include, but are not limited to, Cherry extract, Ginkgo biloba extract, Kava Kava extract, Ginseng extract, Saw Palmetto extract, cranberry or blueberry extract, tomato extract, cordyceps sinensis extract, pomegranates, elderberries, as well as the entire berry family, strawberry, raspberry, cherry, black raspberry, boysenberry, etc., glucosamine sulfate, chromium picolinate, Milk thistle extract, Grape seed extract, Ma Huang extract, Co-enzyme Q10, water soluble vitamins such as vitamin C niacin, vitamin B1 and vitamin B12, and fat soluble vitamins such as vitamins A, D, E, and K, minerals such as calcium, magnesium and zinc, among others. The nutraceuticals include those both water soluble and those that are fat soluble, the fat soluble nutraceuticals being adaptable for direct inclusion with the chocolate formulation, the water soluble being adaptable for inclusion with the filling composition. These various nutraceuticals can be delivered as single agents, combinations of agents and combinations that might incorporate other desirable biologically active materials.

Base Chocolate Composition

Chocolate is preferred as the vehicle for delivering nutraceuticals because it is known to contain compounds that naturally inhibit the breakdown of endogenous cannabinoids, such as anandamide (palmitoyl ethanolamide), thus allowing them to persist longer after they have been produced in the brain, prolonging their endogenous cannabinoid effects. This is very possibly the mechanism of the feeling of well being associated with eating chocolate, as well as possible contributions from theobromine and phenylethylamine which are also present in chocolate. This property reinforces the nutraceutical administration, and promotes repeated consumption over time, to maintain at least minimum levels of the nutraceutical in the body.

Chocolate products are typically mixtures of liquid cocoa, cocoa butter, sugar, lecithin, and possibly milk and flavoring substances, chocolate-like products contain substantially the same ingredients but also any number of vegetable fats, cocoa butter replacers and/or extenders.

In accordance with the present invention, the chocolate base composition is formulated specifically to contribute to the health and well being of the consumer by being fortified with one or more health promoting ingredients. First, the chocolate base composition is made from a good tasting chocolate, whether dark or milk chocolate, that is high in oligomeric proanthocyanadins (OPC'S), more generally referred to as flavanols, so that the base chocolate composition itself may provide beneficial health effects.

It is important to start with cocoa powder and/or chocolate liquor that hasn't been Dutch processed, as the alkali treatment done to remove bitterness, removes the beneficial antioxidant OPCs.

The base chocolate composition further preferably includes a source for docosahexaenoic acid (DHA), a twenty-two carbon omega 3 fatty acid preferably extracted from algae, with no fish taste or odor.

The base chocolate composition may also optionally include phosphatidyl serine, more preferably 85% phosphatidyl serine soy phospholipids as a substitute for the lecithin often used in chocolate compositions. All chocolates require an emulsifier to blend water soluble components with the cocoa butter. Soy lecithin is often used, but using a soy lecithin which is 85% phosphatidyl serine, as opposed to the usual phosphtidyl choline, improves the beneficial properties of the base chocolate composition, as phosphatidyl serine has known dementia prevention properties.

The chocolate product may further optionally include phytosterols, so that the inventive product, as well as delivering a specific nutraceutical, may additionally promote lower LDL cholesterol. Such an addition can possibly lower LDL cholesterol by up to about 12-15%, depending on how much of the product is consumed.

The preferred chocolate product is manufactured in an oxygen free environment. to add the DHA without significant oxidization. In addition, the intrinsic antioxidant activity of the OPCs in the base chocolate composition may prevent the DHA from oxidizing in the finished product, though it may be preferred to package the product under a nitrogen blanket in gas impermeable packaging.

The preferred chocolate product is manufactured in an oxygen free environment. to add the omega 3 fatty acids such as DHA without significant oxidation. In addition, the intrinsic antioxidant activity of the OPCs in the base chocolate composition may prevent the DHA from oxidizing in the finished product, though it may be preferred to package the product under a nitrogen blanket in gas impermeable packaging.

The base chocolate composition is processed using conventional chocolate product manufacturing techniques into a unit dose or fractional unit dose per piece form. Using individual chocolates to orally administer nutraceuticals provides a means to increase the likelihood that long term compliance is achieved, as a user need only consume a minimum number of chocolates to receive beneficial quantities of the delivered nutraceutical.

Use of the preferred chocolate product can likely reduce the risk of cardiovascular disease, and impede or prevent dementia, as DHA and Phosphatidyl serine have been shown to counter the effects thereof. The antioxidants in the chocolate also promote improved circulation, protect collagen, and the product is additionally non-cariogenic.

As the base chocolate preferably is high in OPC's, and these are associated with the bitter flavor in cocoa, various additives may be included in the base chocolate composition to reduce the bitter taste. Adenosine monophosphate (AMP) is one compound that may be used at between 0.0001 and 0.010% by weight. More preferably, about 0.005-0.009%, most preferably about 0.008% is used. Beta-cyclodextrin is another compound that may be used instead of or in combination with AMP. Other ways to improve flavor can be by way of the nutraceuticals themselves. For example, oily extracts of the "medicinal mushroom" Cordyceps sinensis produced by the described extraction procedure can also be incorporated into the chocolate, both for the functional qualities of the extract (enhanced stamina and energy), and to improve taste, since Cordyceps sinensis extract is also rich in adenosine and related compounds.

The chocolate product preferably is formulated to have a low glycemic index and load, that is, very little insulin response, and is free of artificial sweeteners.

A unique base chocolate product is produced which provides a novel delivery system for DHA and/or other omega-3 fats, and OPC's, as well as being capable of use as a delivery vehicle for other nutraceuticals. Consumers of the base chocolate alone will receive significant health benefits, improving adoption of a regimen for daily consumption of DHA, as well as of OPC's, as part of a regular diet.

The inventive base chocolate composition can also be used a vehicle for delivery of fat soluble nutrients—carotenoids (e.g. lutein, lycopene, zeaxanthin, Astaxanthin), vitamin D, K, E, other phospholipids, e.g. Phosphatidyl choline, phosphatidyl inositol, Phosphatidyl ethanolamine, etc., and other natural lipid appetite suppressants, such as stearoyl ethanolamide and oleyl ethanolamide, which are naturally produced in the body from food components.

Low Carb/Low Glycemic Sweetening Blend

One preferred sweetener for use in the inventive chocolate product is an extract of the Chinese fruit known as Lo Han Guo, which contain intensely sweet glycosides, of which five isomers have been defined, ahich are referred to as "mogrosides". These mogrosides are 300 times as sweet as sucrose. Commercial extracts of the fruit are usually greater than 80% mogrosides, so about 250 times as sweet as sucrose.

Sucralose is another high intensity sweetener that may be used which is roughly 600 times as sweet as sucrose.

Tagatose is also a preferred sweetener, particularly in a combination with the Lo Han Guo extract, or other high intensity sweeteners. Tagatose is a naturally occurring sugar with many beneficial and low carbohydrate properties, such as inducing weight loss, appetite suppression, lowering blood sugar, probiotic effects, anti-caries, etc. However, tagatose has a threshold for laxation that is quite low which prevents its use as a primary sweetener.

Thaumatin is another possible sweetener, being a mixture of sweet-tasting polypeptides that can be extracted from the skin surrounding the seeds of the West African katemfe fruit. Thaumatin displays late-onset, intense, sustained sweetness, about 2,000-3,000-times sweeter than sugar on weight basis, and is converted in the body like other proteins. Due to the low dosage required for sweetening, calories are low, non-cariogenic, and it is suitable for diabetics, and is particularly suitable as a flavor enhancer.

A novel sweetening blend usable with the base chocolate composition of the invention comprises from 75-90% wt Lo Han Guo extract and from 10-25% tagatose. This blend may be used in other products as well, and its use is not limited to incorporation in chocolate or confectionery products, but can be a stand alone sweetener, or be used in foods, or beverages. Consequently, a variety of products may benefit from the sweetening blend, as well as the inventive chocolate product discussed here.

As an example, a weight management protein powder which uses about 2 grams of sucralose per kg as a sweetener, could instead utilize an 80% mogrosides Lo Han Guo extract, at about 5 grams of Lo Han Guo extract per kg, with tagatose present in an amount of about 3-8 grams per serving.

The inventive sweetening blend may optionally contain varying amount of other ingredients, such as the so called "essential sugars", i.e., xylose, mannose, galactose, N-acetyl glucosamine, and fucose.

Another optional ingredient is inositol, which would be present at about 0.5 to 5%. While inositol also has a Taxation effect, similar to tagatose, kept in low concentration, this effect is minimized, while still providing a mood enhancement effect.

This preferred sweetening blend may be used in a variety of products, such as the chocolate discussed above, mixes for home made ice creams, puddings, jellos, popsicles, etc. The tagatose will allow browning reactions in baking, and the blend can be used as a full "bulk" sweetener.

The invention thus provides as a preferred vehicle a base chocolate composition that integrates DHA and/or other omega-3 fatty acids with the chocolate, preferably in an oxygen free environment, and having a sweetening blend added comprising a tagatose-Lo Han Guo mixture, and using AMP or beta cyclodextrin to enhance taste of the high flavanol chocolate.

Vanilla, chocolate and other flavors and actives commonly known and used in confectionery products may be added as desired, to enhance product properties, provided they do not substantially degrade the beneficial effects of the various nutraceutical ingredients.

Processing may proceed under an inert atmosphere as nitrogen or carbon dioxide to preserve those ingredients sensitive to oxidation, to preserve effectiveness. This could also include packaging in an inert atmosphere or under vacuum packed to maintain stability.

Delivered Nutraceuticals

While many nutraceutical products can be delivered using the invention, the preferred ingredients are various plant extracts and or concentrates, which are often difficult to administer by other means.

Examples of carried ingredients recovered by extraction include but are not limited to those described in U.S. Pat. No. 6,746,695. Specifically described are bioactive substances that can be separated from such sources which include terpenes, terpenoids, flavones and flavonoids, steroids, sterols, saponins and sapogenins, alkanes, alkaloids, amines, amino acids, aldehydes, alcohols, fatty acids, lipids, lignans, phenols, pyrones, butenolides, lactones, chalcones, ketones, benzenes, cyclohexanes, glucosides, glycosides, cyanidins, furans, phorbols, quinones and phloroglucinols, as well as large molecular weight materials such as proteins, peptides, enzymes, polysaccharides and carbohydrates. Sources from which bioactive substances can be isolated include, but are not limited to various plant species of Kava (such as Kava root), *Byrsonima, Aesculus* (e.g. *A. californica*), *Crataegus mexicana*, Jojoba, *Pfaffia, Altemanthera* (e.g. *A. repens*), *Bursera, Turnera, Perezia, Heimia* (e.g. *H. salicifolia*), *Psidium, Enterlobium, Ptychopetalum* (e.g. *P. olacoides*), *Liriosma* (e.g. *L. ovata*) and *Chaunochiton* (e.g. *C. kappleri*).

Plants from which extracts can be prepared and natural substances isolated include but are not limited to the higher plants: *Acanthopanax, Acanthopsis, Acanthosicyos, Acanthus, Achyranthes, Acokanthera, Aconitum, Acorus, Acronychia, Actaea, Actinidia, Adenia, Adhatoda, Aegle, Aesculus, Aframomum, Agastache, Agathosma, Alchemilla, Aleurites, Allium, Aloe, Alonsoa, Aloysia, Alphitonia, Alpinia, Alternanthera, Amaranthus, Amomum, Amphipterygium, Amyris, Anchusa, Ancistrocladus, Anemopsis, Angelica, Annona, Anonidium, Anthemis, Antidesma, Apium, Aralia, Aristolochia, Artemisia, Artocarpus, Asarum, Asclepias, Asimina, Aspalanthus, Asparagus, Aspidosperma, Astragalus, Astronium, Atropa, Avena, Azadirachta, Azara, Baccharis, Bacopa, Balanites, Bambusa, Barleria, Barosma, Bauhinia, Belamcanda, Benincasa, Berberis, Berchemia, Bixa, Bocconia, Borago, Boronia, Boswellia, Brosimum, Brucea, Brunfelsia, Bryonia, Buddleja, Bulnesia, Bupleurum, Bursera, Byrsonima, Calamintha, Calea, Calophyllum, Camellia, Camptotheca, Cananga, Canarium, Canella, Capparis, Capsicum, Carthamus, Carum, Cassia, Cassine, Castanospermum, Catalpa, Catha, Catharanthus, Cayaponia, Cecropia, Centaurea, Centipeda, Centranthus, Cephaelis, Chiranthodendron, Chondrodendron, Chrysophyllum, Cimicifuga, Cinchona, Cinnamomum, Cistus, Citrus, Clausena, Cnicus, Coccoloba, Codonopsis, Coffea, Coix, Cola, Coleus, Colletia, Combretum, Commiphora, Cordia, Coriaria, Correa, Corydalis, Costus, Crataegus, Croton, Cryptolepis, Cudrania, Cuminum, Cuphea, Cucurma, Cyclanthera, Cymbopogon, Cynara, Cynoglossum, Cyperus, Cyrtocarpa, Dalbergia, Dalea, Danae, Daphne, Datura, Daucus, Decadon, Dendrocalamus, Dendropanax, Deppea, Derris, Desmos, Dichrostachys, Dictamnus, Digitalis, Dillenia, Dioscorea, Dioscoreophyllum, Diosma, Diospyros, Drimys, Duboisia, Duguetia, Dysoxylum, Echinacea, Eclipta, Ehretia, Ekebergia, Eleagnus, Elettaria, Eleutherococcus, Encelia, Entandrophragma, Ephedra, Epimedium, Eriobotrya, Erodium, Eryngium, Erythrochiton, Erythroxylum, Escholzia, Esenbeckia, Euclea, Eucommia, Euodia, Eupatorium, Fabiana, Ferula, Fevillea, Fittonia, Flindersia, Foeniculum, Gallesia, Galphimia, Garcinia, Gaudichaudia, Gaultheria, Gelsemium, Gentiana, Geranium, Gigantochloa, Gingko, Glochidion, Gloeospemum, Grewia, Greyia, Guaiacum, Gymnema, Haematoxylum, Hamamelis, Hamelia, Harpagophytum, Hauya, Heimia, Helleborus, Hieracium, Hierochloe, Hilleria, Hippophae, Houttuynia, Hovenia, Humulus, Huperzia, Hura, Hybanthus, Hydnocarpus, Hydnophytum, Hydrastis, Hydrocotyle, Hymenaea, Hyoscamus, Hypericum, Hyptis, Hyssopus, Iboza, Idiospermum, Ilex, Illicium, Indigofera, Inga, Inula, Iochroma, Iresine, Iris, Jacaranda, Jatropha, Juniperus, Justicia, Kadsura, Kaempferia, Lactuca, Lagochilus, Larrea, Laurus, Lavandula, Lawsonia, Leonurus, Leucas, Ligusticum, Lindera, Lippia, Liriosma, Litsea, Lobelia, Lonchocarpus, Lonicera, Lycium, Macfadyena, Maclura, Mangifera, Mansoa, Marcgravia, Marrubium, Martinella, Matricaria, Maytenus, Medicago, Melissa, Mentha, Mimosa, Mimusops, Mitragyna, Montanoa, Morkillia, Mouriri, Mucuna, Mutisia, Myrica, Myristica, Nardostachys, Nepeta, Nicotiana, Ocotea, Olea, Oncoba, Ophiopogon, Origanum, Pachyrhizus, Panax, Papaver, Pappea, Parthenium, Passiflora, Paullinia, Pelargonium, Penstemon, Perezia, Perilla, Persea, Petiveria, Petroselinum, Peucedanum, Peumus, Pfaffia, Phoebe, Phyllanthus, Phytolacca, Pilocarpus, Pimenta, Pimpinella, Pinellia, Piper, Piqueria, Pithecellobium, Pittosporum, Plectranthus, Pleuropetalum, Podophyllum, Pogostemon, Polygala, Polygonum, Polymnia, Psacalium, Psychotria, Pterygota, Ptychopetalum, Pueraria, Punica, Pycnanthemum, Pygeum, Quararibea, Quassia, Quillaja, Randia, Ratibida, Rauvolfia, Rehmannia, Renealmia, Rheum, Rollinia, Rorippa, Rosmarinus, Rudbeckia, Ruellia, Rumex, Ruscus, Ruta, Saccharum, Salix, Salvia, Sambucus,*

*Sanguinaria, Sapium, Sassafras, Satureja, Sceletium, Schizandra, Securidaca, Securinega, Serenoa, Simmondsia, Smilax, Stachytarpheta, Stachys, Staurogyne, Stelechocarpus, Stephania, Sterculia, Stevia, Strophanthus, Strychnos, Symphytum, Syzygium, Tabebuia, Tabemaemontana, Tabemanthe, Tanacetum, Taxus, Tecoma, Terminalia, Teucrium, Thaumatococcus, Tribulus, Trifolium, Trigonella, Triplaris, Triumfetta, Tumera, Tussilago, Tylophora, Tynnanthus, Uncaria, Urginea, Urtica, Uvaria, Vaccinium, Valeriana, Vallesia, Vangueria, Vanilla, Vellozia, Vepris, Verbascum, Verbena, Vetiveria, Virola, Viscum, Vismia, Vitex, Voacanga, Warburgia, Withania, Zanthoxylum, Zingiber, Zizyphus* and *Zygophyllum*. In addition to the genera of higher plants listed above, compounds can be recovered from such biological sources as algae, bacteria, fungi, lichens, mosses, and marine organisms such as corals, sponges, tunicates or other invertebrate or vertebrate organisms.

Other full spectrum extracts, particularly those low in sugar are particularly useful with the present. Some of these are described in U.S. Patent Publication 2004/0166177. For example, berries such as blueberry, cranberry, and cherries, as well as grapes and tomatoes contain specific and numerous bioactive compounds that have multiple beneficial health properties. Even their colorants such as anthocyanins have been implicated for their health effects in a wide variety of plants. These generally contain natural antioxidants may help prevent carcinogenesis, and prevent some peroxidative damage in living tissue. Carotenoids also are thought to play an important role in preventing or ameliorating disease processes based on their anti-oxidative activity. Fatty acids, terpenes, and alkaloids represent further groups that have separate and distinct roles in maintaining health.

In one extraction of cherries, 83% of total carotenoids (mostly lycopene) were removed while eliminating more than 90% of the free sugar. In another, the extracted material contained carotenoids, anthocyanins, fatty acids, terpenes, and alkaloids in the same relative proportion as that found in the starting material.

In other studies, blueberries were placed into a chromatography chamber and extracted first with water and alcohol (10-40% methanol in water) at 100 psi. A wide range of phytoactive substances were removed. The relative proportions of substances in the extract were similar to their proportions in the blueberry plant material.

Example-Base Chocolate Composition

| | | |
|---|---|---|
| Batch Weight(g): | | 300 |
| Serving Size (g): | | 40 |

| Ingredient: | Wt (g): | Batch %: |
|---|---|---|
| Natural Chocolate Liquor | 165.85 | 55.28% |
| Cocoa Butter | 57.78 | 19.26% |
| Anhydrous milkfat | 17.37 | 5.79% |
| Refined Tagatose | 37.50 | 12.50% |
| phytosterols (Reducol ™) | 18.00 | 6.00% |
| AMP | 0.024 | 0.0080% |
| Water | 0.072 | 0.0240% |
| Beta-cyclodextrin | 0.06 | 0.0200% |
| Phosphatidyl serine | 1.200 | 0.400% |
| Lo-Han Guo Extract | 1.667 | 0.556% |
| Supervan #9975 | 0.030 | 0.010% |
| Dried Cream Extract | 0.450 | 0.150% |
| Total: | 300 | 100.00% |

Procedural Notes: grind Tagatose with mortar and pestle; heat up liquor, CB, AMF, and phosphatidyl serine to 130° F.; dry blend all dry ingredients and sieve to remove lumps; add all dry ingredients to melted choc and mix well; mix AMP and water to form a 25% solution, add to liquor blend; temper and mold.

Nutraceutical and Vehicle

One form of delivery is by formulating the nutraceutical as part of a composition used as a liquid or crème center. Conventional filled chocolates are fairly well known, and provide a unique delivery system for nutraceuticals. Instead of contained in a hard or soft capsule, or pressed into a tablet, the nutraceutical is encapsulated in a chocolate shell. This gives the consumer the pleasurable taste and response associated with typical chocolate, while at the same time delivering various supplements that are beneficial to the user. With the chocolate formulation of the present invention, with the unique sweetener, the user also avoids the calories associated with such confectionaries.

As one example, a phytochemical concentrate was obtained by extraction from frozen whole berries with propane or dimethyl ether under 100 psi pressure, similar to the cherry concentrate discussed previously. The obtained berry concentrate was then dried and prepared as a crème, formulated for delivering about 800 mg concentrate per piece of chocolate. This quantity was chosen so as to deliver a 1600 mg dose of concentrate by consuming two pieces per day. This will deliver an amount sufficient to significantly relieve arthritic and other types of inflammatory pain in a majority of people. The following details the preparation of the cherry concentrate for use as a creme center for a piece of chocolate:

| | | | |
|---|---|---|---|
| Crème Batch Size (g): | | | 200 |
| Piece Size (g): | | | 7.2 |
| Fill Percentage: | | | 50.00% |
| Target weight of berry extract per piece (g): | | | 0.800 |

| Ingredient | Set | % | Wt (g) |
|---|---|---|---|
| Part 1 | | | |
| Maltisweet B (SPI) | 39.867 | 14.91% | 29.825 |
| Maltisweet MH-65 (SPI) | 39.867 | 14.91% | 29.825 |
| Berry Concentrate | 66.667 | 24.94% | 49.875 |
| Lo Han Guo | 0.669 | 0.25% | 0.500 |
| Sugar Free Frappe (see ingredients below) | 19.994 | 7.48% | 14.958 |
| Lactitol ACM 50 (Danisco) | 90.204 | 33.74% | 67.483 |
| Nutresca (Aarhus) | 10.07 | 3.77% | 7.534 |
| Total: | 267.338 | 100.00% | 200.000 |
| Frappe formulation | | | |
| Crystalline Lactitol | 155.28 | 87.41% | 26.224 |
| Water | 17.06 | 9.60% | 2.881 |
| Egg Albumen | 5.3 | 2.98% | 0.895 |
| Total: | 177.64 | 1 | 30.000 |

The crème was prepared and dosed in accordance with conventional chocolate confectionery processing techniques, but instead, using the chocolate formulation discussed previously.

A number of individuals sampled the above filled chocolates and considered the taste to be the same or better than conventional filled chocolates. The consumers could detect no taste or other effects which would suggest that the filled chocolates were actually part of a nutraceutical delivery system. Consequently, consumers will readily consume the product of the invention, increasing likely long term administration of the carried nutraceuticals.

Various other dried or powdered nutraceuticals could be substituted for the cherry concentrate in the above formulation, with some adjustments made for the amount of the nutraceutical to be delivered. Generally, from 100 to 1000 mg of a nutraceutical can be blended into a crème for dosing per piece of chocolate consumed.

With the above formulation, each piece would weigh only about 8 grams, including the 800 mg of berry concentrate, and so consuming two to four pieces will deliver from 1600 to 3200 mg of the berry concentrate when consumed.

While a crème is shown, various nutraceuticals may be better prepared as a liquid or suspension, both of which are fairly conventional for inclusion in a filled chocolate product. Depending on the nutraceutical, some additional sweeteners, thickeners, coloring agents, etc, may be needed to prepare the liquid for incorporation as a filling for a chocolate. This is within the skill of one familiar with confectionery formulations, and adjustments would likely be made on a case by case basis. Given the limited amount of material comprising the filling, it is possible to use conventional sweeteners with the filling potion, without overloading the overall product with calories, as such a sweetener would be only a small fraction of the overall product weight.

By way of example, a liquid extract of hawthorn berry, or a liquid blueberry extract could be used to provide a liquid center filling in the base chocolate product described above. Various other nutraceuticals in liquid form can easily be accommodated using the delivery system of the present invention, for example, a cranberry extract containing product could be used to inhibit bladder infection.

While preferred embodiments of the present invention have been shown and described, various changes or modification could be made without varying from the scope of the present invention. For example, dark, milk or white chocolate, among others, may be used in the present invention, using conventional reformulating techniques.

What is claimed is:

1. A chocolate product formulated for delivering a nutraceutical combined therewith by oral administration comprising:
    a chocolate formulation containing:
    a chocolate base that is high in oligomeric proanthocyanadins;
    adenosine monophosphate (AMP), present at between 0.002 and 0.010% by weight;
    docosahexaenoic acid (DHA);
    fat soluble nutrients; and,
    a low caloric sweetener containing 75-90% wt Lo Han Guo extract and from 10-25% tagatose; and,
    a nutraceutical incorporated with the chocolate formulation.

2. The chocolate product of claim 1 wherein the fat soluble nutrients are selected from the group consisting of carotenoids, lutein, lycopene, zeaxanthin, Astaxanthin, vitamin D3, vitamin K, vitamin E, phospholipids, Phosphatidyl choline, phosphatidyl inositol, Phosphatidyl ethanolamine, lipid appetite suppressants (stearoyl ethanolamide, oleyl ethanolamide), Phosphatidyl serine and combinations thereof.

3. The chocolate product of claim 1 further comprising Phosphatidyl serine.

4. The chocolate product of claim 1 further comprising soy lecithin.

5. The chocolate product of claim 1 wherein the AMP is present at between about 0.005-0.009% by weight.

6. The chocolate product of claim 1 further comprising a supplemental sweetener selected from the group consisting of sucralose, thaumatin, D-mannose and combinations thereof.

7. A filled chocolate product for delivering a nutraceutical by oral administration comprising:
    a chocolate formulation containing:
    a chocolate base that is high in oligomeric proanthocyanadins;
    adenosine monophosphate (AMP), present at between 0.002 and 0.010% by weight;
    docosahexaenoic acid (DHA);
    fat soluble nutrients; and,
    a low caloric sweetener containing 75-90% wt Lo Han Guo extract and from 10-25% tagatose, the chocolate formulation formed into a chocolate product formed for receiving a filling therein; and,
    a liquid or creme filling, the nutraceutical incorporated in the filling which is received in the chocolate product for oral delivery therewith.

8. The chocolate product of claim 7 wherein the nutraceutical incorporated in the filling is selected from the group consisting of bioactive substances separated from plant sources which include terpenes, terpenoids, flavones and flavonoids, steroids, sterols, saponins and sapogenins, alkanes, alkaloids, amines, amino acids, aldehydes, alcohols, fatty acids, lipids, lignans, phenols, pyrones, butenolides, lactones, chalcones, ketones, benzenes, cyclohexanes, glucosides, glycosides, cyanidins, furans, phorbols, quinones and phloroglucinols, proteins, peptides, enzymes, polysacoharides and carbohydrates.

9. The chocolate product of claim 7 wherein the nutraceutical incorporated in the filling is a concentrate prepared from a plant selected from the group consisting of blueberry, cranberry, cherries, grapes, tomatoes, mushrooms, pomegranates, elderberries, strawberry, raspberry, blackberry, black raspberry, boysenberry, saw palmetto, and combinations thereof.

10. The chocolate product of claim 1 wherein the nutraceutical is a supplement selected from the group consisting of vitamins, minerals, herbs, plant extracts, concentrates of plants and combinations thereof.

11. The chocolate product of claim 1 wherein the nutraceutical is selected from the group consisting of Ginkgo biloba extract, Kava Kava extract, Ginseng extract, Saw Palmetto extract, berry extract, cherry extract, cranberry extract, blueberry extract, tomato extract (lycopene), glucosamine sulfate, chromium picolinate, Milk thistle extract, Hawthorn extract, Grape seed extract, Ma Huang extract, Co-enzyme Q010, water soluble vitamins, vitamin C, niacin, vitamin B1, vitamin B12, fat soluble vitamins, vitamin A, vitamin D, vitamin E, vitamin K, omega-3 fatty acids, minerals, calcium, magnesium, zinc, and combinations thereof.

12. A method for oral administration of a nutraceutical to a mammal comprising:
    providing a chocolate formulation having a chocolate base that is high in oligomeric proanthocyanadins:
    incorporating in the chocolate formulation adenosine monophosphate present at between 0.002 and 0.010% by weight, docosahexaenoic acid (DHA), fat soluble nutrients, and a low caloric sweetener containing 75-90% wt Lo Han Guo extract and from 10-25% tagatose;
    incorporating the nutraceutical with or in the chocolate formulation; and,
    producing individual or separable chocolate products each containing a single or fractional dose of the nutraceutical.

* * * * *

UNITED STATES PATENT AND TRADEMARK OFFICE
CERTIFICATE OF CORRECTION

PATENT NO. : 7,632,532 B2  
APPLICATION NO. : 11/298724  
DATED : December 15, 2009  
INVENTOR(S) : Dwight McKee et al.

Page 1 of 1

It is certified that error appears in the above-identified patent and that said Letters Patent is hereby corrected as shown below:

ON THE TITLE PAGE OF THE PATENT: Item (73) Assignee: "Eurak, LLC, Batesville, AR (US)" should be --Eurark, LLC, Batesville, AR (US)--

Signed and Sealed this
Twelfth Day of April, 2016

Michelle K. Lee
*Director of the United States Patent and Trademark Office*